United States Patent [19]

Krafft et al.

[11] Patent Number: 5,370,981
[45] Date of Patent: Dec. 6, 1994

[54] ANTISTATIC PLASTIC ARTICLES

[75] Inventors: Werner Krafft, Leverkusen; Friedrich Jonas, Aachen, both of Germany; Bavo Muys, Mortsel; Dirk Quintens, Lier, both of

[73] Assignee: Agfa-Gevaert AG, Leverkusen, Germany

[21] Appl. No.: 36,263

[22] Filed: Mar. 24, 1993

[30] Foreign Application Priority Data

Apr. 6, 1992 [DE] Germany .............................. 4211461

[51] Int. Cl.$^5$ .............................................. G03C 1/85
[52] U.S. Cl. .................................... 430/529; 430/527; 430/536; 430/537; 430/627; 430/628; 430/631; 428/403; 428/409; 428/922
[58] Field of Search ............... 430/527, 529, 536, 537, 430/627, 628, 631; 428/403, 922, 409

[56] References Cited

U.S. PATENT DOCUMENTS

| 4,582,782 | 4/1986 | Valsecchi | 430/527 |
| 4,914,018 | 4/1990 | Besio et al. | 430/527 |
| 4,959,430 | 9/1990 | Jonas et al. | 528/373 |
| 4,987,042 | 1/1991 | Jonas et al. | 528/373 |
| 5,006,451 | 4/1991 | Anderson et al. | 430/527 |
| 5,013,637 | 5/1991 | Tsukada | 430/527 |
| 5,035,926 | 7/1991 | Jonas et al. | 526/257 |

FOREIGN PATENT DOCUMENTS 0440957 8/1991 European Pat. Off.

OTHER PUBLICATIONS

Database WPI Week 9018, Derwent Publications Ltd., London, GB; AN 90-134685 & JP-A-2 081 032 (Toyota Cent Res. & Dev.; Toyoda Gosei KK) 22 Mar. 1990.
Database WPI Week 9231, Derwent Publications Ltd., London GB; AN 92-254080 & JP-A-4 170 493, (Mitsubishi Paper Mills Ltd.), 18 Jun. 1992.
Research Disclosure Bd. 334, Nr. 83, 28 Feb. 1992, England, pp. 155-159, XP291266 Anonymous, 'Thermal Dye Sublimation Transfer'.

Primary Examiner—Charles L. Bowers, Jr.
Assistant Examiner—Thomas R. Neville
Attorney, Agent, or Firm—Connolly & Hutz

[57] ABSTRACT

Antistatically treated plastic formed articles, e.g. photographic film supports, that contain at least two layers on the surface to be antistatically treated, wherein a layer nearer to the plastic surface contains a preparation of a polythiophene that is built up from structural units of the formula

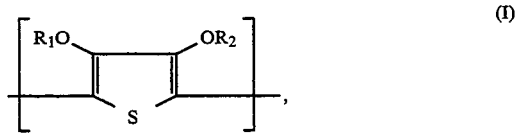

(I)

wherein
$R_1$ and $R_2$ independently of each other stand for hydrogen or a $C_1$-$C_4$-alkyl group or together form an optionally substituted $C_1$-$C_4$-alkylene group, preferably a methylene group optionally substituted by alkyl groups, a 1,2-ethylene group optionally substituted by $C_1$-$C_{12}$-alkyl or phenyl groups, a 1,3-propylene group or a 1,2-cyclohexylene group, and a polyanion, a farther layer contains a film-forming polymer and at least one of the two layers contains an alkoxysilane, are characterized, apart from excellent antistatic properties, by very good layer adhesion.

17 Claims, No Drawings

ANTISTATIC PLASTIC ARTICLES

The invention relates to an adherent antistatic finish for plastic formed articles, e.g. photographic film supports, based on polythiophene preparations.

It is known to use preparations of polythiophenes that contain polyanions for the antistatic finishing of plastic formed parts, especially of supports for photographic materials (EP-440 957). It has now become apparent that the antistatic layer, while its antistatic effect is excellent, has drawbacks in adherence.

It has been the problem of the invention to remove this drawback without impairing the antistatic effect.

This problem is surprisingly solved by applying at least two layers to the surface to be antistatically treated of the plastic formed article, of which a layer nearer to the plastic surface contains a preparation of a polythiophene that is built up of structural units of the formula

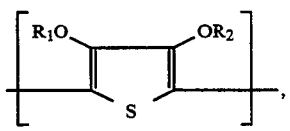
(I)

wherein
$R_1$ and $R_2$ independently of each other stand for hydrogen or a $C_1$-$C_4$-alkyl group or together form an optionally substituted $C_1$-$C_4$-alkylene group, preferably a methylene group optionally substituted by alkyl groups, a 1,2-ethylene group optionally substituted by $C_1$-$C_{12}$-alkyl or phenyl groups, a 1,3-propylene group or a 1,2-cyclohexylene group,
and a polyanion, a farther layer contains a film-forming polymer and at least one of the two layers contains a silane of formula (II)

(II)

in which
$R_3$ represents a hydrogen atom, an aliphatic hydrocarbon group with less than 10 carbon atoms or an acyl group with less than 10 carbon atoms,
X represents

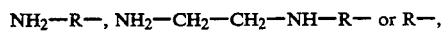

R represents a hydrocarbyl group with 1 to 20 C atoms, and m is 1 to 3.

As representatives of the optionally substituted $C_1$-$C_4$-alkylene groups that $R_1$ and $R_2$ together can form there may be mentioned preferably the 1,2-alkylene groups derived from the 1,2-dibromoalkanes obtainable by bromination of α-olefins, such as ethylene, 1-propene, 1-hexene, 1-octene, 1-decene, 1-dodecene and styrene; also there may be mentioned the 1,2-cyclohexylene, 2,3-butylene 2,3-dimethyl-2,3-butylene and 2,3-pentylene groups.

Preferred groups for $R_1$ and $R_2$ together are the methylene, 1,2-ethylene and 1,3-propylene groups, the 1,2-ethylene group being especially preferred.

As polyanions for the polythiophene there can be used the anions of polymeric carboxylic acids such as polyacrylic acids, polymethacrylic acids or polymaleic acids and polymeric sulphonic acids such as polystyrenesulphonic acids and polyvinylsulphonic acids. These polycarboxylic and polysulphonic acids can also be copolymers of vinylcarboxylic acids and vinylsulphonic acids with other polymerizable monomers such as acrylate esters and styrene.

The molecular weight of the polyacids providing the polanions is preferably 1000 to 2,000,000, especially 20,000 to 200,000. The polyacids or their alkali salts are obtainable commercially, e.g. polystyrenesulphonic acids and polyacrylic acids, or can be prepared by known methods (see e.g. Houben-Weyl, Methoden der organischen Chemie, Bd. E 20 Makromolekulare Stoffe, Teil 2 (1987), p. 1141 ff.).

Instead of the free polyacids required for the formation from polythiophenes and polyanions of the preparations according to the invention, mixtures of alkali salts of the polyacids and corresponding amounts of monoacids can also be used.

The preparations can be true solutions, colloidal solutions or finely-divided dispersions.

The production of these preparations is described in EP-A-0 440 957.

As solvents for the polythiophene preparations, apart from water, other protic solvents are possible, e.g. lower alcohols such as methanol, ethanol and isopropanol as well as mixtures of water with lower alcohols and other organic solvents miscible with water such as acetone.

The polythiophene preparations may contain in addition anionic, cationic or nonionic surface active agents. These agents can be added before, during or after the manufacture of the polythiophene preparations. The surface active agents are added in an amount of 0 to 20% by weight, based on the total solids of the polythiophene preparation. Preferred agents are alkylphenolpolyglycol ether, e.g. the addition product of 4 moles of ethyleneoxide and 1 mol of nonylphenole.

For antistatic treatment of the plastic formed articles and films, the polythiophene preparations can be applied to these latter by known methods, e.g. by dip-coating, casting, spraying, gravure, knife coating, spreading etc. After removal of the solvent, e.g. the water, the antistatic layer formed on the treated support from the polythiophene, irrespective of the atmospheric moisture, is immediately present.

To obtain better adherent and scratchproof coatings, polymeric binders suspensible or soluble in water, e.g. polyvinyl alcohol or polyvinyl acetate dispersions, also can be added in addition to the polythiophene-salt preparations.

With acid-sensitive plastic formed articles and to protect the devices used for application, it can be advantageous before application to the plastic support to neutralize excess free acid groups in the polythiophene salt preparations according to the invention by addition of alkali or alkaline earth hydroxides, ammonia or amines.

The thickness after drying of the layers in which the polythiophene dispersions according to the invention are applied to the plastic formed articles and films to be antistatically treated is 0.001 to 100 μm, preferably 0.001 to 0.5 μm, dependent on the desired conductivity of the formed article and the desired transparency of the coating.

The solvent can be removed after applying the solutions by simple evaporation at room temperature. But to obtain higher processing speeds it is more advantageous to remove the solvents at elevated temperatures, e.g. at temperatures of 20° to 150° C., preferably 40° to 100° C.

The polythiophene dispersions can be prepared in presence of polymer latices or polymer dispersions that have acid groups (salts) such as $-SO_3^-$, $-COO^-$ or $-PO_3^{2-}$. The content of acid groups preferably exceeds 2 wt % in order to ensure a sufficient stability of the dispersion. The particle sizes of the dispersions are in the range from 5 nm to 1 μm, preferably in the range 5 to 100 nm.

Polymers suitable for this purpose are described for example in DE-A 25 41 230, DE-A 25 41 274, DE-A 28 35 856, EP-A-0 014 921, EP-A-0 069 671, EP-A-O 130 115 and U.S. Pat. No. 4,291,113.

The polymer dispersions or latices can consist of linear, branched or crosslinked polymers. The crosslinked polymer latices with high content of acid groups are swellable in water and are designated as microgels. Such microgels are described for example in U.S. Pat. Nos. 4,301,240, 4,677,050 and 4,147,550.

As substrates that are antistatically or that is to say electroconductively treated according to the invention, there may be mentioned primarily formed articles of organic plastics, especially films of polycarbonates, polyamides, polyethylenes, polypropylenes, polyvinyl chloride, polyesters, cellulose acetate and cellulose, but inorganic materials, e.g. glass or ceramic materials made from aluminium oxide and/or silicon dioxide, also can be antistatically treated by the process according to the invention.

The polythiophene dispersions according to the invention can also be used for the antistatic treatment of hot-sealable films, such as are described in DE-A-38 38 652, and for the antistatic treatment of magnetic recording materials.

Owing to their transparency, the coatings obtainable in accordance with the invention are suitable in particular for the antistatic treatment of photographic materials, especially films, e.g. black-and-white, colour negative and reversal films, preferably in the form of a back layer, that is in a layer that is applied to the side of the film base remote from the silver halide emulsion layers.

The polythiophene dispersion is preferably applied in an amount of 0.001 to 0.3 g/m², preferably 0.001 to 0.03 g solid per m².

Preferred silanes correspond to the formulae

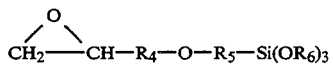

and

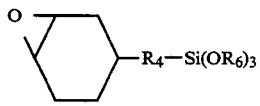

where $R_4$ and $R_5$ independently of each other represent alkylene groups with 1 to 4 carbon atoms, and $R_6$ represents a hydrogen atom or an alkyl group with 1 to 10 carbon atoms.

The silanes are added to one of the two or to both layers in an amount of 1 to 300 wt %, preferably 10 to 100 wt % relative to the solid of the polythiophene preparation.

Preferably at least 40 wt % of the silane is added to the farther layer.

Suitable film-forming polymeric materials of the farther layer are e.g. cellulose derivatives such as cellulose diacetate, cellulose triacetate, cellulose acetate propionate, methylcellulose or ethylcellulose, especially cellulose diacetate.

Also suitable are polyacrylates, poly(methyl methacrylate)s, polyurethanes, lacquer systems curable by ionizing radiation, polystyrene or copolymers of the underlying monomers.

To the farther layer there can also be added further substances such as lubricants, e.g. polyethylene dispersions, spreaders such as e.g. polyacrylate beads or finely-divided inorganic pigments.

The farther layer is applied as a solution in organic solvents such as alcohols, ketones, hydrocarbons or chlorinated hydrocarbons or in the form of an aqueous solution or dispersion.

Solvent mixtures of water and/or organic solvents can also be used.

The film-forming organic polymer is preferably used in an amount of 0.001 to 2 g/m², especially 0.1 to 1 g/m².

Example 1

On a transparent triacetate support of thickness 125 μm, provided on the front with an adhesive layer, after application of the antistatic and protective coatings on the back, a light-sensitive multilayer structure of the following composition was cast onto the front according to the following examples.

The data on amounts refer to 1 m² in each case: the silver halide application corresponds to the equivalent amount of AgNO₃; all silver halide emulsions are stabilized with 0.1 g 4-hydroxy-6-methyl-1,3,3a,7-tetraazaindene per 100 g AgNO₃.

Layer structure: (front)

1st Layer: (antihalation layer)
    0.2 g black colloidal silver
    1.2 g gelatin
    0.1 g UV absorber UV 1
    0.2 g UV absorber UV 2
    0.02 g tricresyl phosphate
    0.03 g dibutyl phthalate 2nd Lay: (micrate intermediate layer)
    0.25 g AgNO₃ of a micrate-Ag (Br,I) emulsion: mean particle diameter=0.07 μm, 0.5 mol % iodide
    1.0 g gelatin
    0.05 g coloured coupler RM 1
    0.10 g tricresyl phosphate 3rd Layer: (low-sensitivity red-sensitized layer)
    2.2 g AgNO₃, 4 mol% iodide, mean particle diameter 0.45 μm, red-sensitized
    2.0 g gelatin
    0.6 g colourless blue-green coupler C 1 emulsified in 0.5 g tricresyl phosphate (TCP)
    50 mg coloured blue-green coupler RM 1 and 30 mg DIR coupler DIR 1 emulsified in 20 mg TCP 4th Layer: (high-sensitivity red-sensitized layer)
2.8 g AgN$_3$, 8.5 mol % iodide, mean particle diameter 0.8 µm, red-sensitized
1.8 g gelatin
0.15 g colourless blue-green coupler C 2 emulsified with 0.15 g dibutyl phthalate (DBP)

5th Layer: (separation layer)
0.7 g gelatin
0.2 g 2,5-diisooctylhydroquinone emulsified with 0.15 g DBP 6th Layer: (low-sensitivity green-sensitized layer)
1.8 g AgNO$_3$ of a spectral green-sensitized Ag(Br,I) emulsion with 4.5 mol % iodide and a mean particle diameter of 0.4 µm, green-sensitized
1.6 g gelatin
0.6 g purple coupler M1
50 mg masking coupler YM1 emulsified with 50 mg TCP
30 mg DIR coupler DIR 2 emulsified in 20 mg DBP
30 mg DIR coupler DIR 3 emulsified in 60 mg TCP 7th Layer: (high-sensitivity green-sensitized layer)
2.2 g AgNO$_3$, with 7 mol % iodide and a mean particle diameter of 0.7 µm, green-sensitized
1.4 g gelatin
0.15 g purple coupler M2 emulsified with 0.45 g TCP 30 mg masking coupler according to 6th layer emulsified with 30 mg TCP 8th Layer: (separation layer)
0.5 g gelatin
0.1 g 2,5-diisooctylhydroquinone emulsified with 0.08 g DBP 9th Layer: (yellow filter layer)
0.2 g Ag (yellow colloidal silver sol)
0.9 g gelatin
0.2 g 2,5-diisooctylhydroquinone emulsified with 0.16 g DBP 10th Layer: (low-sensitivity blue-sensitive layer)
0.6 g AgNO$_3$, 4.9 mol % iodide, mean particle diameter of 0.45 µm, blue-sensitized,
0.85 g gelatin
0.7 g yellow coupler Y 1 emulsified with 0.7 g TCP
0.5 g DIR coupler DIR 3, emulsified with 0.5 g TCP 11th Layer: (high-sensitivity blue-sensitive layer)
1.0 g AgNO$_3$, 9.0 mol % iodide, mean particle diameter 0.9 µm, blue-sensitized
0.85 g gelatin
0.3 g yellow coupler according to the 10th layer emulsified with 0.3 g TCP 12th Layer: (anti-abrasion and hardening layer)
0.5 g AgNO$_3$ of a micrate-Ag(Br,I) emulsion of mean particle diameter 0.07 µm, 0.5 mol % iodide
1.2 g gelatin
0.4 g hardener of the formula (CH$_2$=CH—SO$_2$—CH$_2$—CONH—CH$_2$—)$_2$—
1.0 g formaldehyde trap of the formula

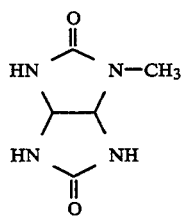

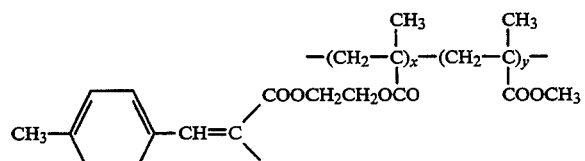

UV-1

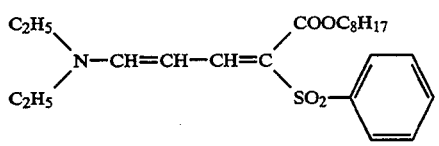

UV-2

-continued
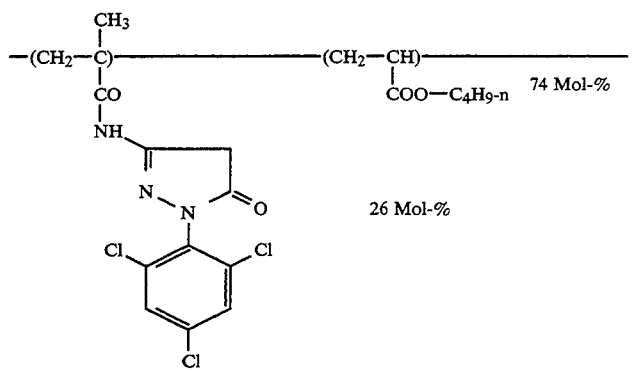
M1
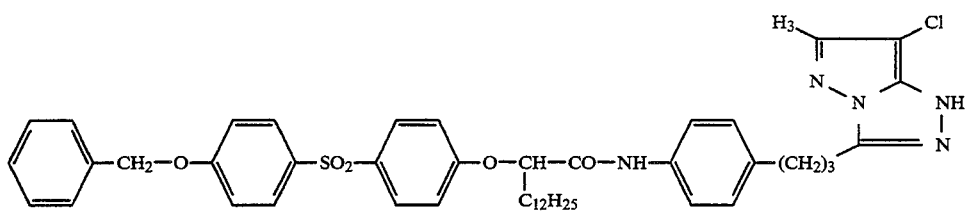
M2
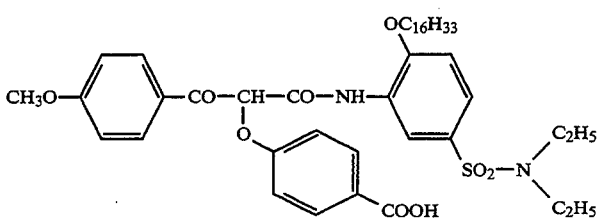
Y1
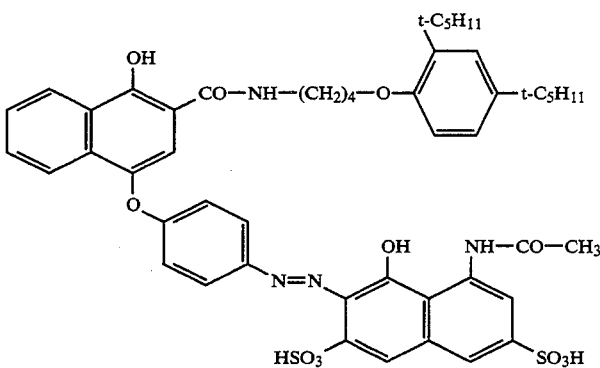
RM1
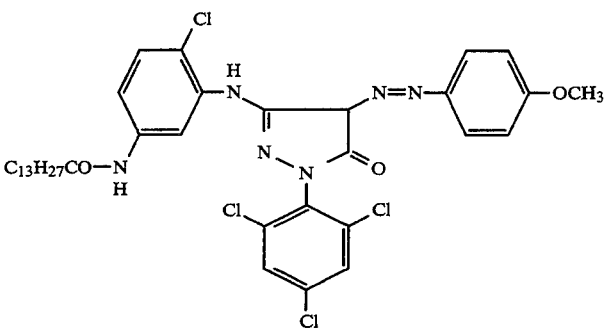
YM1

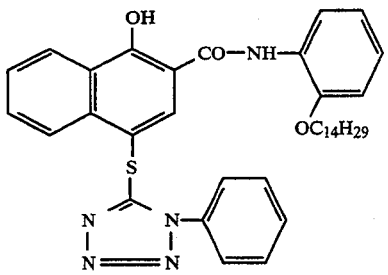

DIR 1

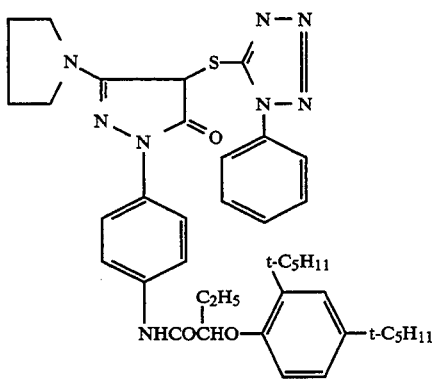

DIR 2

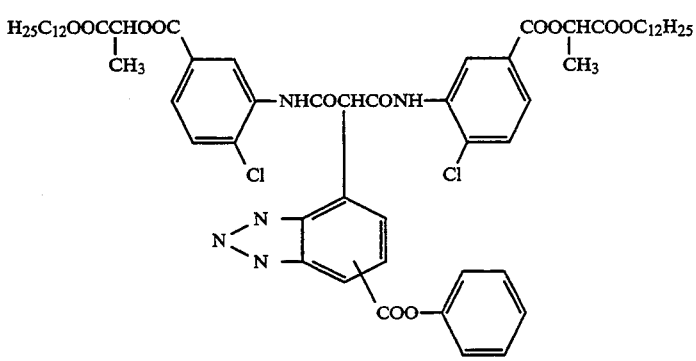

DIR 3

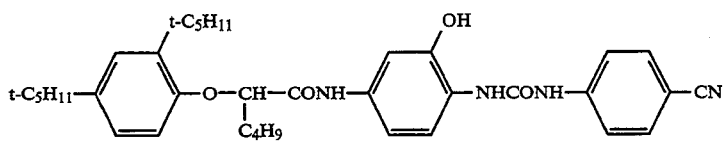

C 1

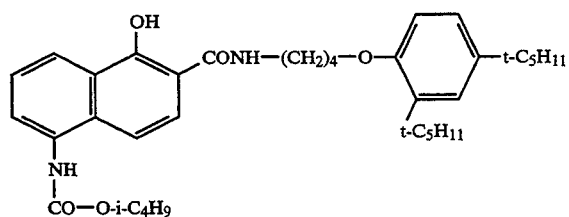

C 2

The complete layer thickness (dry) of the colour structure is 4 µm.

Preparation of 3,4-polyethylenedioxythiophene-polystyrene-sulphonate Solution 1.(PEDT/PSS-1)

Air is passed with stirring at room temperature for 24 hours into the solution of 20 g polystyrenesulphonic acid (Mn 40,000); 5.6 g 3,4-ethylenedioxythiophene; 2.7 g potassium peroxodisulphate (=10 mmol) and 25 mg iron(III) sulphate in 1100 ml deionized water. The blue solution is subsequently filtered through a filter cloth and has a solids content of 2.1 wt %.

Preparation of Polythiophene-polystyrenesulphonate Solution 2 (PEDT/PSS 2)

A solution of 20 g polystyrenesulphonic acid (Mn 40,000); 5.6 g 3,4-ethylenedioxythiophene; 8.1 g potassium peroxodisulphate (30 mmol) and 50 mg iron(III) sulphate (Fe content 22 wt %) in 966 ml deionized water is stirred at room temperature for 24 hours. A blue-coloured aqueous solution of 3,4-polyethylenedioxythiophene with a solids content of 3.2 wt % is obtained.

Desalting by Means of Ion Exchangers 500 ml of the above PEDT/PSS solution 2 is diluted with 250 ml water. After addition of 40 g weakly basic ion exchanger and 40 g strongly acidic ion exchanger, the solution is stirred for 8 hours at room temperature. The ion exchanger is then filtered off and desalted PEDT/PSS solutions with a solids content of 1.6 wt % are obtained. The solution now still contains only 0.4 g potassium ions/liter and 5 mg sulphate ions/liter, that is the ion exchanger has reduced the amount of potassium ions by 74 % and the amount of sulphate ions by 99%.

Preparation of antistatic layers 1–4

In accordance with Table 1 the above antistatic solutions are mixed by mixing PEDT/PSS solutions 1 and 2 with the appropriate amounts of water, methanol, acetone and if necessary silane, and the solution, filtered through a folded filter, is applied from a dip pan by means of a wash-on roll to an unsubstrated cellulose triacetate support and dried at 60°–70° C. The wet application rate is ca. 25 ml/m².

Preparation of covering layers 1–3

In accordance with Table 2, if silane is used, acetone is first mixed with glycidoxypropyltrimethoxysilane and then a solution of cellulose diacetate in acetone is added with stirring. Then the appropriate amount of methanol, and finally the indicated mixture of water and the PE dispersion are added to the mixture. Analogously to the antistatic solution, this solution is applied to the antistatic layer, and like the latter dried. The wet application thickness is ca. 15μ.

TABLE 1

| Antistatic layer | 1 | 2 | 3 | 4 | 5 |
|---|---|---|---|---|---|
| PEDT/PSS solution 1 [ml] | 14.3 | 14.3 | — | — | — |
| PEDT/PSS solution 2 [ml] | — | — | 20 | 9.3 | 4.7 |
| Water [ml] | 10.7 | 10.7 | 5 | 15.7 | 18.3 |
| Methanol [ml] | 10 | 10 | 10 | 10 | 10 |
| Acetone [ml] | 65 | 62 | 65 | 65 | 58 |
| Epoxysilane [ml] (1 wt % in acetone) | — | 3 | — | — | 7 |
| Wet application rate [ml/m²] | 65 | 25 | 25 | 25 | 25 |

TABLE 2

| Covering layer | 1 | 2 | 3 |
|---|---|---|---|
| Cellulose diacetate [ml] 10 wt % in acetone | 20 | 20 | 20 |
| Acetone [ml] | 630 | 610 | 530 |
| Methanol [ml] | 330 | 330 | 330 |
| Water [ml] | 17 | 17 | 17 |
| Epoxysilane [ml] (1 wt % in acetone) | — | 20 | 100 |
| Polyethylene dispersion (5 wt % in H₂O) [ml] | 3 | 3 | 3 |
| Wet application rate [ml/m²] | 15 | 15 | 15 |

TABLE 3

| Test | PEDT/PSS solution | Anti-static solution solids [g/100 ml] | Anti-static layer | Covering layer | Silane added [wt %] In anti-static layer | Silane added [wt %] In covering layer | Conductivity Ω/□ (50% RH): Non-processed | Conductivity Ω/□ (50% RH): Processed | Layer detachment [%] |
|---|---|---|---|---|---|---|---|---|---|
| 1 | 1 | 0.3 | 1 | 1 | 0 | 0 | $6 \times 10^6$ | $5 \times 10^6$ | 10–15 |
| 2 | 1 | 0.3 | 1 | 2 | 0 | 10 | $4 \times 10^6$ | $6 \times 10^7$ | 1 |
| 3 | 1 | 0.3 | 1 | 3 | 0 | 50 | $2 \times 10^6$ | $8 \times 10^7$ | 0 |
| 4 | 2 | 0.14 | 5 | 3 | 100 | 50 | $2 \times 10^7$ | | 1 |
| 5 | 1 | 0.3 | 2 | 2 | 10 | 10 | $7 \times 10^6$ | $7 \times 10^7$ | 10 |
| 6 | 2 | 0.3 | 3 | 1 | 0 | 0 | $<10^6$ | $<10^{13}$ | 100 |
| 7 | 2 | 0.3 | 3 | 3 | 0 | 50 | $<10^6$ | $<10^6$ | 10 |
| 8 | 2 | 0.14 | 4 | 1 | 0 | 0 | $<10^6$ | $3 \times 10^6$ | 5–10 |
| 9 | 2 | 0.14 | 4 | 3 | 0 | 50 | $<10^6$ | $1 \times 10^6$ | 0 |

The silane added in wt % relates to the solids of the layer concerned.

If now the antistatic layers 1–5 are combined with the covering layers 1–3 according to the sequence listed in Table 3, the following is seen:

The addition of silane to the covering layer greatly increases the layer adhesion and, at the appropriate amount added, reduces the layer detachment to zero (see Table 3, Tests 3 and 9). At the same time, the conductivity of the layer also survives after the processing. The addition of the silane to the antistatic layer alone instead of to the covering layer, on the other hand, impairs the layer adhesion or, that is to say, increases the layer detachment (Table 3, Test 4 compared with 1 & 2). If the silane is also added to the covering layer in addition, an improvement of the layer adhesion is at once observed again (Table 3, Test 5).

Example 2

When using PET supports instead of triacetate, to obtain adherent PEDT/PSS layers the following solutions were used:

Preparation of Polythiophene-polystyrenesulphonate Solution PEDT-PSS 3)

A solution of 20 g polystyrenesulphonic acid (Mn =40,000), 5.6 g 3,4-ethylenedioxythiophene, 13 g potassium peroxodisulphate and 100 mg iron(III) sulphate (9H₂O), dissolved in deionized water to 1 liter total solution, is stirred for 24 hours at room temperature. A blue-coloured aqueous solution of the 3,4-polyethylenedioxythiophene with a solids content of 3.8 wt % is obtained.

Desalting by Means of Ion Exchangers (PEDT/PASS 4)

100 ml of the above PEDT/PSS solution are diluted with 1000 ml water. After addition of 100 g weakly basic ion-exchanger and 100 g strongly acidic ion exchanger, the solution is stirred for 6 hours at room temperature. After that the ion exchanger is filtered off and a desalted PEDT/PSS solution with a solids content of 1.28 wt % is obtained. The solution now still contains only 0.4 g potassium ions per liter and is practically free from sulphate ions.

Preparation of the antistatic layers 6-9

430 g of the above PEDT/PSS-4 solution are mixed with 5070 ml water. This solution is subdivided and glycidoxypropyltrimethoxysilane is added to the portions of solution in accordance with Table 4.

These portions of solution are then applied in accordance with Table 4 to a polyethylene terephthalate support (PET) that is provided with an adhesive layer of a terpolymer latex of vinylidene chloride/methacrylate/itaconic acid and colloidal silicic acid with a surface area of 100 m²/g.

Wet application rate: 20 ml/m²
Casting speed: 10 m/min
Drying temperature: 100° C.

TABLE 4

| Antistatic layer | Dry film thickness (mg/m²) | | |
|---|---|---|---|
| | PEDT/PSS | Silane | Wt % |
| 6 | 20 | — | 0 |
| 7 | 20 | 2.5 | 11 |
| 8 | 20 | 5 | 20 |
| 9 | 20 | 10 | 33 |

The wt % silane values relate to the solids of the layer.

The covering layer solutions 4-6 listed in Table 5 are prepared in parallel with the antistatic layer solutions 6-9. They consist of a ,solution of poly(methylmethacrylate) in 80/20 acetone/methoxypropanol and are applied with a dry film thickness of 0.5 g/m². They contain in addition various amounts of glycidoxypropyltrimethoxysilane in accordance with Table 5.

Wet application rate: 20 ml/m²
Casting speed: 8 m/min
Drying temperature: 120° C.

TABLE 5

| Covering layer | Dry film thickness (mg/m² | |
|---|---|---|
| | PMMA | Silane |
| 4 | 500 | — |
| 5 | 500 | 50 |
| 6 | 500 | 250 |

If now the antistatic layers 6-9 are combined with the covering layers 4-6 according to Table 6, the following is seen:

The addition of the epoxysilane to the antistatic layer alone improves only the layer adhesion of the antistatic layers without covering layer.

The addition of the epoxysilane to the covering layer alone improves the adhesion of the covering layer to the antistatic layer.

The wet adhesion of antistatic layer and covering layer is good when epoxysilane is added to the antistatic layer and the covering layer.

In Table 6 which follows,
A. L.=antistatic layer
C. L.=covering layer
Ω/□=resistance/square
τ=discharging time
The lower is the discharging time, the better are the antistatic properties of the sample concerned.

TABLE 6

| Test | A.L. | C.L. | Silane added (%) in A.L. | Silane added (%) in C.L. | Conductivity (30% RH, non-processed) LW (Ω/□) × 10⁸ | τ (msec) | Wet adhesion 0 = v. good 4 = bad |
|---|---|---|---|---|---|---|---|
| 1 | 6 | — | 0 | — | 1 | 0.09 | 4 |
| 2 | 7 | — | 11 | — | 2 | 0.15 | 4 |
| 3 | 8 | — | 20 | — | 4 | 0.40 | 3 |
| 4 | 9 | — | 33 | — | 10 | 0.40 | 0 |
| 5 | 6 | 4 | 0 | 0 | 50 | 0.70 | 4 |
| 6 | 6 | 5 | 0 | 10 | 130 | 0.70 | 3 |
| 7 | 6 | 6 | 0 | 50 | 48 | 0.10 | 2 |
| 8 | 7 | 4 | 11 | 0 | 100 | 0.30 | 4 |
| 9 | 7 | 5 | 11 | 10 | 180 | 0.60 | 1 |
| 10 | 7 | 6 | 11 | 50 | 140 | 0.20 | 1 |
| 11 | 8 | 4 | 20 | 0 | 59 | 0.50 | 4 |
| 12 | 8 | 5 | 20 | 10 | 280 | 0.40 | 0 |
| 13 | 8 | 6 | 20 | 50 | 150 | 0.40 | 0 |
| 14 | 9 | 4 | 33 | 0 | 190 | 0.40 | 4 |
| 15 | 9 | 5 | 33 | 10 | 230 | 0.90 | 0 |
| 16 | 9 | 6 | 33 | 50 | 720 | 0.40 | 0 |

We claim:

1. Antistatic plastic formed articles containing at least two layers on the surface of which an antistatic layer located nearer to the plastic surface contains a preparation of a polythiophene that is built up form structural units of the formula

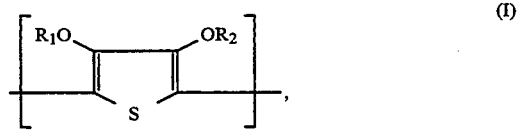 (I)

in which
R₁ and R₂ independently of each other stand for hydrogen or a C₁-C₄-alkyl group or together form an optionally substituted C₁-C₄-alkylene group, or a 1,2-cyclohexylene group, and a polyanion, wherein said polythiophene preparation contains solids, a protective layer located farther from the plastic surface than the antistatic layer contains a film-forming polymer and at least one of the at least two layers contains a silane of formula (II)

$$X_{4-m}-Si(OR_3)_m \quad (II)$$

in which
R₃ represents a hydrogen atom, an aliphatic hydrocarbon group with less than 10 carbon atoms or an acyl group with less than 10 carbon atoms,
X represents

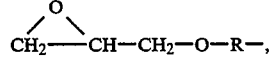

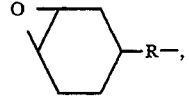

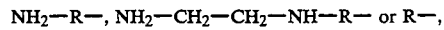

R represents a hydrocarbyl group with 1 to 20 C atoms, and
m is 1 to 3 in an amount of 1 to 300 Wt-% relative to the solids of the polythiophene preparation, and at least 10 wt-% of the silane present in said at least one of said at least two layers is contained in the protective layer.

2. Plastic formed articles according to claim 1, characterized in that the silane has the formula

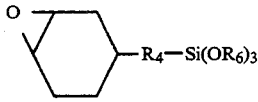

wherein

R$_4$ represents an alkylene group with 1 to 4 carbon atoms, and

R$_6$ represents a hydrogen atom or an alkyl group with 1 to 10 carbon atoms.

3. Photographic materials with a plastic base that contains on the one side at least one silver halide emulsion layer, characterized in that on the other side it contains at least two layers according to claim 1.

4. Photographic material according to claim 3, characterized in that the plastic base is a transparent cellulose triacetate or polyester film.

5. Plastic formed articles according to claim 1 wherein the total amount of the silane present in said at least one of said at least two layers is 10 to 100 wt-%, relative to the solids of the polythiophene preparation.

6. Antistatic plastic formed articles according to claim 1, wherein both said antistatic layer and said protective layer contain said silane in an amount of 1 to 300 wt-% relative to the solids of the polythiophene preparation, and at least 10 wt-% of the silane present in said at least two layers is contained in the protective layer.

7. Antistatic plastic formed articles according to claim 1, wherein at least 40 wt-% of the silane present in said at least two layers is contained in the protective layer.

8. Antistatic plastic formed articles according to claim 6, wherein at least 40 wt-% of the silane present in said at least two layers is contained in the protective layer.

9. Plastic formed articles according to claim 1, wherein R$_1$ and R$_2$ together form a methylene group optionally substituted by alkyl groups, a 1,2-ethylene group optionally substituted by C$_1$-C$_{12}$-alkyl or phenyl groups or a 1,3-propylene group.

10. Antistatic plastic formed articles containing at least two layers on the surface of which an antistatic layer located nearer to the plastic surface contains a preparation of a polythiophene that is built up from structural units of the formula

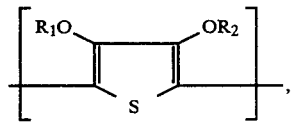

(I)

in which

R$_1$ and R$_2$ independently of each other stand for hydrogen or a C$_1$-C$_4$-alkyl group or together form an optionally substituted C$_1$-C$_4$-alkylene group or a 1,2-cyclohexylene group, and a polyanion, wherein said polythiophene preparation contains solids, a protective layer located farther from the plastic surface than the antistatic layer contains a film-forming polymer and at least one of the at least two layers contains a silane of formula (II)

$$X_{4-m}-Si(OR_3)_m \quad (II)$$

in which

R$_3$ represents a hydrogen atom, an aliphatic hydrocarbon group with less than 10 carbon atoms or an acyl group with less than 10 carbon atoms, X represent

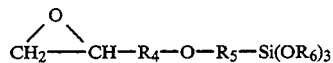

wherein

R$_4$ and R$_5$ independently of each other represent alkylene groups with 1 to 4 carbon atoms, and R$_6$ represents a hydrogen atom or an alkyl group with 1 to 10 carbon atoms, and m is 1 to 3 in an amount of 1 to 300 wt-% relative to the solids of the polythiophene preparation, and at least 10 wt-% of the silane present in said at least one of said at least two layers is contained in the protective layer.

11. Photographic materials with a plastic base that contains on the one side at least one silver halide emulsion layer, characterized in that on the other side it contains at least two layers according to claim 10.

12. Photographic material according to claim 11, characterized in that the plastic base is a transparent cellulose triacetate or polyester film.

13. Plastic formed articles according to claim 10 wherein the total amount of the silane present in said at least one of said at least two layers is 10 to 100 wt-%, relative to the solids of the polythiophene preparation.

14. Antistatic plastic formed articles according to claim 10, wherein both said antistatic layer and said protective layer contain said silane in an amount of 1 to 300 wt-% relative to the solids of the polythiophene preparation, and at least 10 wt-% of the silane present in said at least two layers is contained in the protective layer.

15. Antistatic plastic formed articles according to claim 10, wherein at least 40 wt-% of the silane present in said at least two layers is contained in the protective layer.

16. Antistatic plastic formed articles according to claim 14, wherein at least 40 wt-% of the silane present in.

17. Plastic formed articles according to claim 10, wherein R$_1$ and R$_2$ together form a methylene group optionally substituted by alkyl groups, a 1,2-ethylene group optionally substituted by C$_1$-C$_{12}$-alkyl or phenyl groups or a 1,3-propylene group.

* * * * *

UNITED STATES PATENT AND TRADEMARK OFFICE
CERTIFICATE OF CORRECTION

PATENT NO. : 5,370,981
DATED : December 6, 1994
INVENTOR(S) : KRAFFT ET AL.

It is certified that error appears in the above-indentified patent and that said Letters Patent is hereby corrected as shown below:

Column 16, line 56, after the word "in" insert the words --said at least two layers is contained in the protective layer--.

Signed and Sealed this

Fifteenth Day of August, 1995

Attest:

BRUCE LEHMAN

*Attesting Officer*     *Commissioner of Patents and Trademarks*